Figure 1:
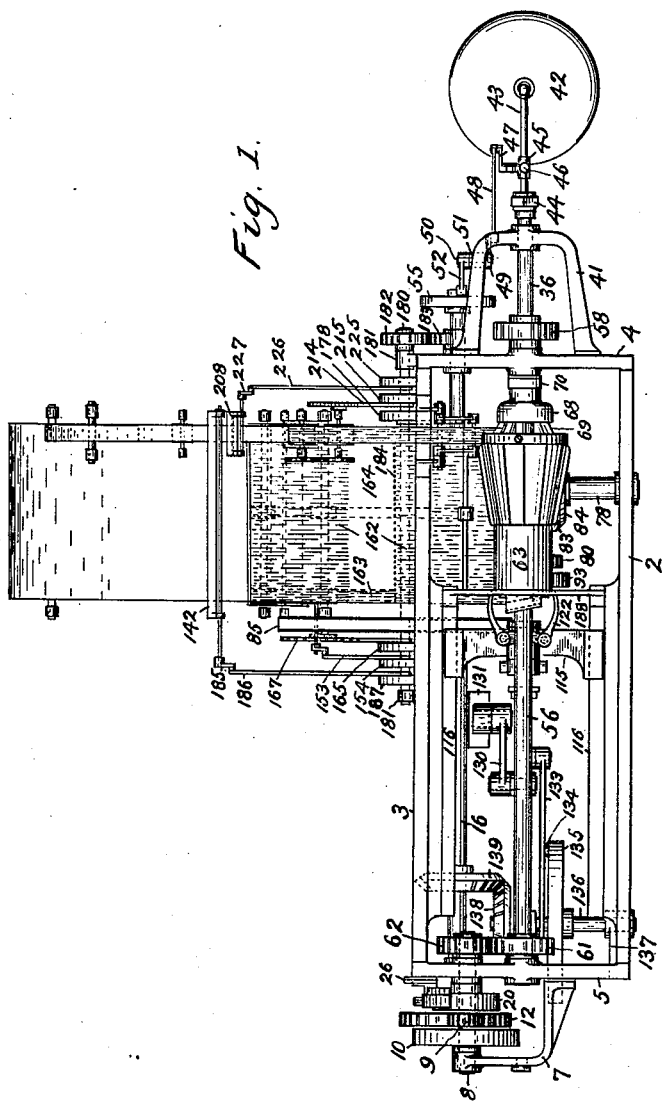

L. P. BROWN.
BOTTLE MAKING MACHINE.
APPLICATION FILED FEB. 10, 1910.

968,535.

Patented Aug. 30, 1910.
6 SHEETS—SHEET 1.

Witnesses:
J. B. Craig
F. C. Kay

Inventor
Luther P. Brown.
By his Attorney
Wm Bodge

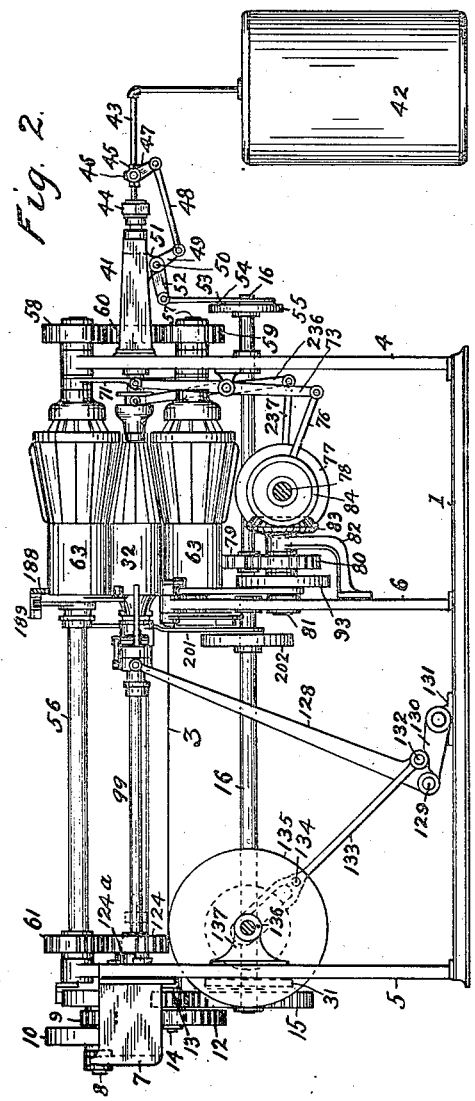

L. P. BROWN.
BOTTLE MAKING MACHINE.
APPLICATION FILED FEB. 10, 1910.
968,535.
Patented Aug. 30, 1910.
6 SHEETS—SHEET 3.
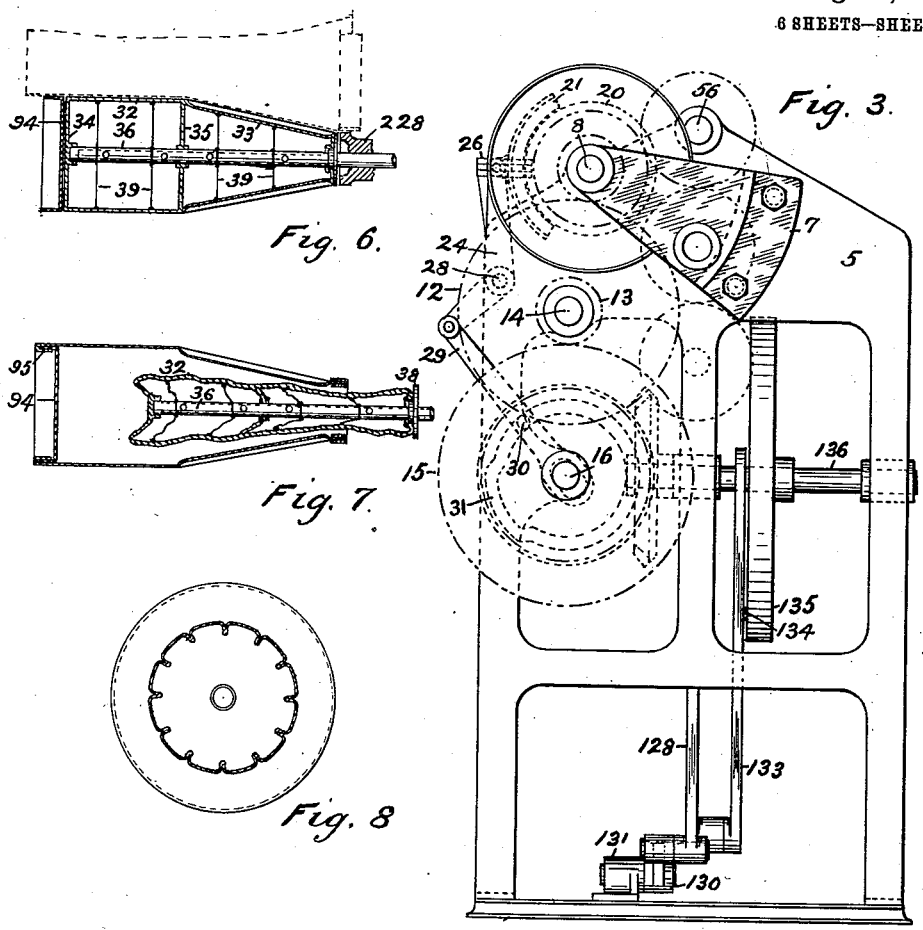
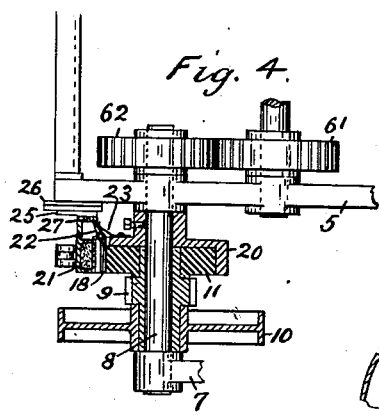
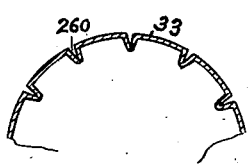
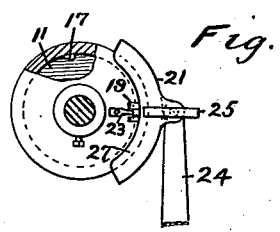
Witnesses:
Jo. B. Craig
F. C. Kay
Inventor
Luther P. Brown
By his Attorney
Wm Bodge

L. P. BROWN.
BOTTLE MAKING MACHINE.
APPLICATION FILED FEB. 10, 1910.

968,535.

Patented Aug. 30, 1910.

6 SHEETS—SHEET 4.

Witnesses:
Jo. B. Craig
H. le Kaye

Inventor
Luther P. Brown
By his Attorney
Wm Bodge

L. P. BROWN.
BOTTLE MAKING MACHINE.
APPLICATION FILED FEB. 10, 1910.
968,535.
Patented Aug. 30, 1910.
6 SHEETS—SHEET 5.
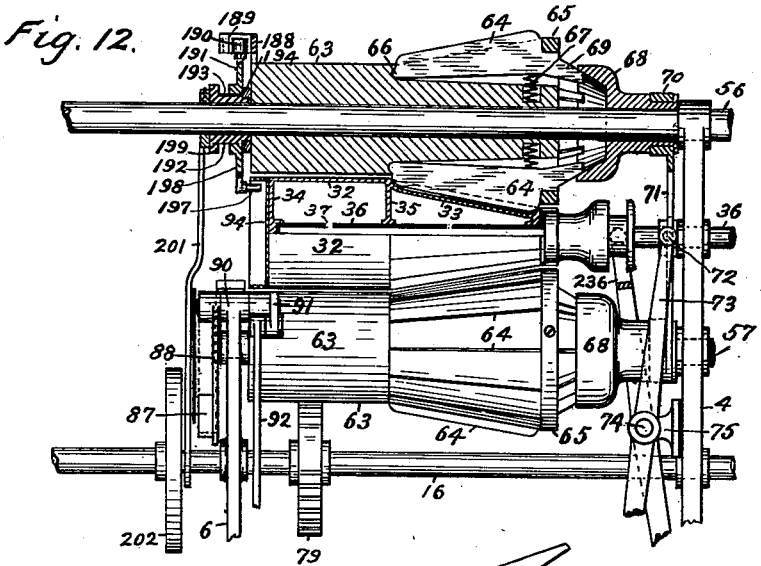
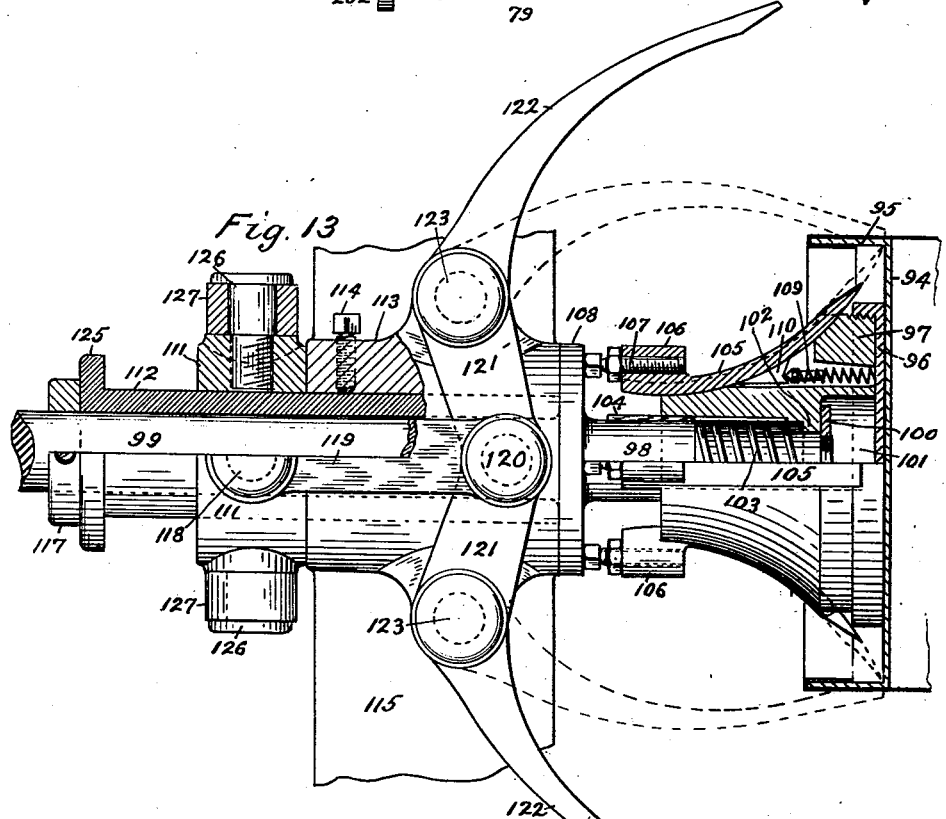
Witnesses:
Jo. B. Craig
F. C. Kaye
Inventor
Luther P. Brown
By his Attorney
Wm Bodge L. P. BROWN.
BOTTLE MAKING MACHINE.
APPLICATION FILED FEB. 10, 1910.
968,535.
Patented Aug. 30, 1910.
6 SHEETS—SHEET 6.
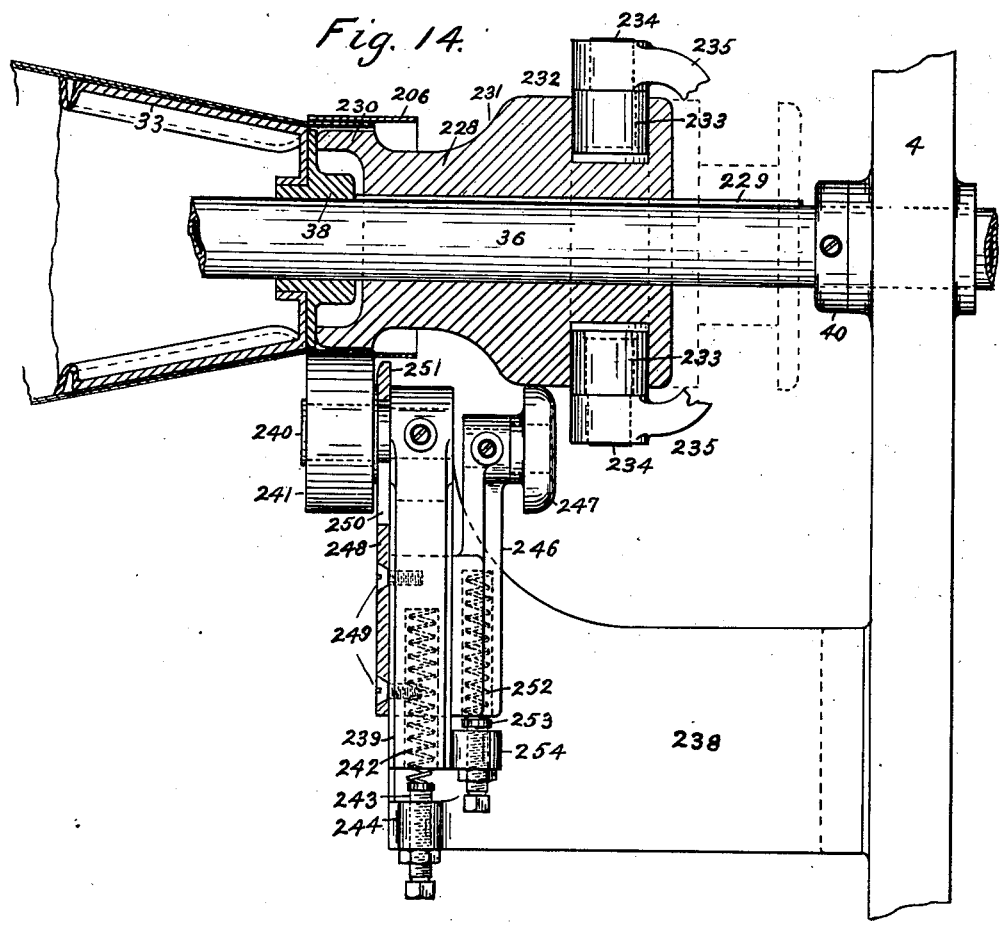
Fig. 14.
Fig. 15.
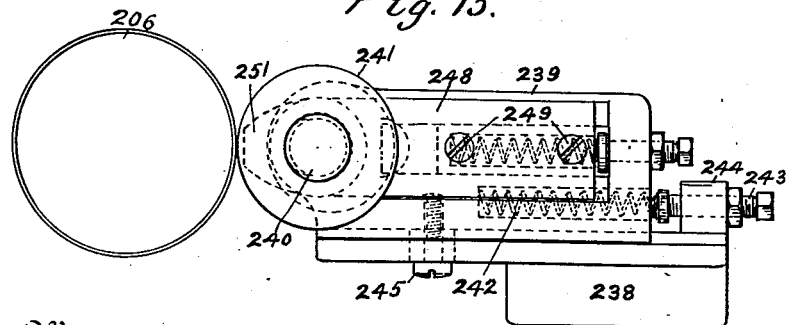
Witnesses:
Jo. B. Craig
Y. C. Kayr.
Inventor
Luther P. Brown.
By his Attorney
Wm Bodge

UNITED STATES PATENT OFFICE.

LUTHER P. BROWN, OF BROOKLYN, NEW YORK, ASSIGNOR TO MONO SERVICE BOTTLE COMPANY, A CORPORATION OF MAINE.

BOTTLE-MAKING MACHINE.

968,535.  Specification of Letters Patent.  Patented Aug. 30, 1910.

Application filed February 10, 1910. Serial No. 543,042.

*To all whom it may concern:*

Be it known that I, LUTHER P. BROWN, citizen of the United States, and resident of Brooklyn, in the county of Kings and State of New York, have invented a certain new and useful Bottle-Making Machine, of which the following is a specification.

The invention relates to bottle-making machines for the formation of flexible paper bottles of the general character described in Letters Patent of the United States of America, granted to me on June 29, 1909, No. 926,237.

The present invention comprehends a hollow flexible bottle-form mounted for intermittent rotation, means for inflating the same, means for feeding, rotating, and clamping blanks, constituting bottle-bottoms, against the rotatable form, mouth-shaping devices coacting with the form, means for intermittently feeding to the form a web of paper of greater width than the length of the bottle, perforating means for effecting transverse lines of perforations along the web, means for applying a suitable adhesive to a portion of the web between the several perforated lines, means for leading the web a plurality of turns around the rotatable form and contiguous bottle-bottom, means for compressing the web thus prepared upon the rotatable form and bottle-bottom and in conjunction with the mouth-shaping devices, means for arresting the travel of the web to sever the partially formed sheet along the adjacent line of perforations, means for turning a margin of the sheet thus formed over a section of the bottle-bottom, means for feeding, transversely perforating, and applying an adhesive to a reinforcing band, means for leading and compressing said band a plurality of turns around the mouth portion of the previously formed sheet and having a marginal portion thereof projecting therefrom, means for arresting the travel of the band to sever the attached portion along the adjacent line of perforations, means for turning over the projecting marginal portion of the band and compressing it upon the interior surface of the previously-formed mouth, means for deflating the bottle-form, and means for withdrawing the bottle thus formed and discharging it from the machine.

Figure 9:
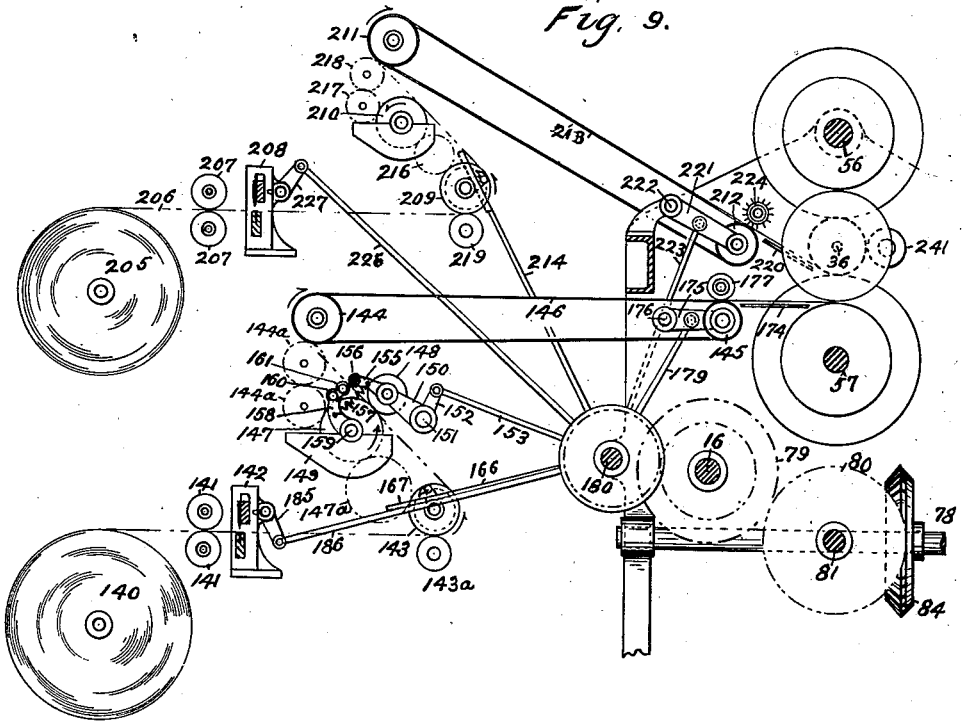
Figure 10:
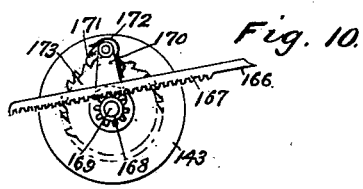
Figure 11:
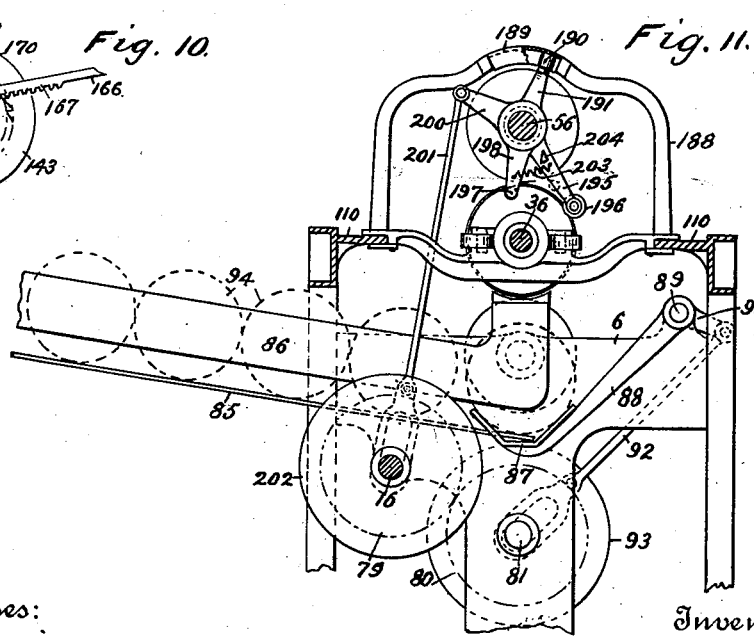

In describing the invention in detail, reference is had to the accompanying drawings, forming part of this specification, wherein like characters of reference are used to designate like parts throughout the several views, and in which:

Figure 1 is a ground plan of the improved bottle-making machine. Fig. 2 is a side elevation of the same, having a side frame removed to show the interior of the machine. Fig. 3 is an end elevation showing the driving-gear. Fig. 4, an enlarged detail view, partially in section, of a portion of the main driving-gear. Fig. 5, an end view of the main driving clutch and brake. Fig. 6, a longitudinal section of the bottle-form, shown in connection with the bottle-bottom blank and mouth-former. Fig. 6$^a$, a fragmental transverse section of the neck of the bottle-form. Fig. 7, a longitudinal section of a finished bottle, shown as partially withdrawn from a deflated form. Fig. 8, a transverse section through the neck of the bottle. Fig. 9 is a side view of the web and band feeding, perforating, gluing and severing devices, shown in relation to the bottle-form and rollers. Fig. 10, an enlarged detail side view of the driving mechanism of the devices shown in Fig. 9. Fig. 11 is an end view of a portion of the machine, showing the means for feeding and positioning the bottle-bottom blanks, and also the device for turning over and affixing thereto the margin of the sheet forming the body of the bottle. Fig. 12 is an enlarged view of the bottle-forming mechanism, partially in sections. Fig. 13 is an enlarged detail view of a positioning and clamping device for the bottle-bottoms, in conjunction with the grippers for withdrawing and discharging the finished bottle, shown partially in section. Fig. 14 is an enlarged view of the mouth-forming device, also shown partially in section. Fig. 15, a side view of the forming-roller shown in Fig. 14.

Referring to Figs. 1, 2, 3 and 4, numeral 1 designates the base of the machine, upon which are mounted the side frames 2 and 3, the end frames 4 and 5, and the intermediate frame 6. Upon the end frame 5 is secured a bracket 7 and within said bracket and frame is journaled a main driving shaft 8, carrying the loosely mounted pinion-wheel 9, provided with extending side hubs, upon one of which is fixed the driving-pulley 10, and upon the opposite hub is likewise fixed the clutch-disk 11. The driving pulley and pinion gear are arranged for continuous rotation, the latter intermeshing with the gear-wheel 12, which, with a jointly connected pinion 13, is loosely mounted upon a stud 14, fixed to the frame 5. The pinion 13 engages a gear-wheel 15, fixed upon the cam-shaft 16, which in turn extends the length of the machine and is rotatably mounted in the end and the intermediate frames thereof. By means of the above-mentioned driving-pulley and the several gears, the cam-shaft 16 is continuously driven a reduced number of turns, each corresponding with an operative cycle of the machine. For intermittently driving the shaft 8, the clutch-disk 11 is provided with a driving-notch or keyway 17, which is adapted to engage a key-lever 18, pivotally mounted between the lugs 19, formed on the clutch-casing 20, a recess being provided in the latter for affording the necessary movement of the key-lever for its engagement and disengagement with the clutch-disk. The key-lever is provided with an outwardly extending actuating-arm 22, which is engaged by a spring 23, secured upon the side face of the clutch-casing, for normally retaining said key-lever in driving engagement with the clutch-disk. The clutch-casing 20 is fixedly secured to shaft 8, and is also provided with a smooth peripheral surface for the engagement of the brake 21, which latter is pivotally mounted on the upper end of lever 24, and is provided with laterally-extending slide-bar 25, horizontally movable in a guide 26, fixed upon the end frame 5. An inwardly-projecting cam-shaped flange 27 is also formed upon the brake for engagement with the arm 22 of the key-lever 18, for disengaging the latter from the clutch-disk against the action of the spring 23. The brake-supporting lever 24 is pivotally mounted upon a stud 28, fixed to the frame 5, and the lever is further provided with a depending arm, hingedly connected to a cam-rod 29, slidable upon cam-shaft 16. Upon the cam-rod is rotatably secured a roller 30, which engages a cam 31, fixed to shaft 16, exteriorly of the adjacent frame. By suitably shaping this cam, the cam-rod 29 and lever 24 are actuated to cause an inward and outward movement of the brake 21, toward and away from the clutch-casing 20, in a horizontal plane, this direction of movement being effected by the slide-bar 25. The double movement of the brake occurs at each revolution of the cam-shaft, or operative cycle of the machine, and provides an intermittent drive for the bottle shaping or forming mechanism, the inward movement causing the disconnection of the clutch and the application of the brake for the instant arrest of shaft 8, and the outward movement effecting a continuation of rotation of said shaft by the release of the brake and the reengagement of the clutch.

The bottle-forming mechanism includes a hollow flexible form, preferably composed of rubber, and more clearly shown in Figs. 6, 6ª, 7, 12 and 14. The form comprises a cylindrical body portion 32, an inwardly-tapering neck section 33, a closed bottom member 34, and a web member 35, all integrally formed. The form is fixed upon a tubular shaft 36, which is closed at the inner end, and provided with air-passages 37, leading to the interior of the form. A collar 38 is fixed upon the tubular shaft, and to the collar is secured by vulcanization, or otherwise, the contracted portion of the neck section 33. In like manner are fixedly secured to the tubular shaft, the bottom and web members of the form, and for additionally securing the peripheral walls thereof to the shaft, flexible ties 39 are employed. This shaft is provided with a stop-collar 40, and is rotatively mounted in the end frame 4, and in the bracket-bearing 41, secured to the latter. For the inflation of the form, a reservoir 42 for the supply of air under pressure is provided and connected by the fixed supply-pipe 43 to the rotatable tubular form-shaft 36, a stuffing-box 44, of ordinary construction, fixed upon the end of the form-shaft, providing the necessary sliding connection between the supply-pipe and the movable shaft. For controlling the flow of air to and from the form, the pipe 43 is provided with a three-way cock 45, having an exhaust-nozzle 46, and provided with the usual form of oscillatory plug-valve, which is actuated by the arm 47, fixedly secured thereon, the movement of the arm in one direction causing the air to flow from the reservoir through the tubular shaft and air passages, into the form, and by its movement in the opposite direction, arresting such flow and exhausting the air, previously admitted to the form, through the nozzle 46. For imparting movement to the arm 47, a connection-rod 48 is hingedly connected at one end thereto, the opposite end being in like manner connected to lever 49, fixed upon one end of a rock-shaft 50, mounted for movement in a bearing 51, formed on an arm of the bracket-bearing 41. Upon the opposite end of this rock-shaft, a lever-arm 52 is fixed, which is pivotally connected to one end of a cam-rod 53, the opposite end of which is loosely mounted for guiding movement upon the cam-shaft 16. A roller 54 is mounted upon the cam-rod and engages a cam-groove in the cam-wheel 55, secured upon the cam-shaft. It will thus be noted that at each revolution of the cam-shaft, air is admitted and exhausted from the form for respectively inflating and deflating the same, the air supplied to the form being of such tension as to insure the complete expansion and resilience of the same when inflated for the suitable formation of the bottle.

Coacting with the inflated form, on opposite sides thereof, are upper and lower pressure-rolls respectively fixed to shafts 56 and 57, on the outer ends of which are likewise fixed the gears 58 and 59, jointly engaging the gear 60, fixed upon the tubular form-shaft, for uniformly driving the several pressure-rolls and form-shaft a common number of turns, which motion is transmitted through the upper roll-shaft 56, the gear 61, fixed thereon, and the intermeshing gear 62, fixed upon the intermittently-rotating shaft 8. The pressure-rolls are constructed of rigid material, the body section 63 thereof being cylindrical in form and preferably corresponding in diameter with that of the body portion 32 of the form. Extending from the body section, the rolls are gradually enlarged in diameter to form outwardly tapering surfaces corresponding with the inwardly tapering neck-section 33 of the form, to secure a uniform tension therebetween throughout the length thereof. Radial slots are provided in the tapered portion of the pressure-rolls, in which are slidingly carried the crimping blades 64, held in position at one end by the detachable rings 65, and at the opposite end by the convex portions 66, which engage concave terminals in the radial slots, for permitting of pivotal movement thereabout for the projection and retraction of the opposite end of the blades. By means of springs 67, the blades are normally projected against the rings 65, and the inward movement thereof, is effected against the action of the springs by the dogs 68, which are rotatable with and slidable on their respective pressure-roll shafts, and are provided with tapering recesses the outwardly-flaring walls of which engage for retraction the projecting and correspondingly tapered terminals of the blades 69. Annular grooves are formed in the hubs of the dogs to loosely receive the bearing-ends 70 of the shifter-bar 71, each of the bearing-ends being provided with detachable caps to permit of engagement with the grooved hubs. Upon the shifter is provided a pin 72, which is engaged by the upper end of lever 73, pivotally mounted at 74 in the bracket 75, secured to end frame 4. For the actuation of lever 73, its lower end is connected with a cam-rod 76, operatively engaged by the cam 77, secured to shaft 78. This latter shaft is driven from cam-shaft 16, at a rotative speed similar therewith, by a spur-gear 79, fixed thereon, and which in turn engages a similar gear 80, fixed upon a short shaft 81, rotatably mounted in a bearing formed in the intermediate frame 6, and in a second bearing at the end of bracket 82, secured to said frame. (See Figs. 1, 2 and 9.) A bevel-gear 83, secured to one end of shaft 81, engages a corresponding bevel-gear 84, fixed upon shaft 78, which, as previously described, jointly actuates the dogs 68, through the medium of the cam 77, cam-bar 76, lever 73, and shifter-bar 71, for projecting and retracting the crimping-blades 64. The crimping-blades at their working-edges are beveled in cross-section and their ends somewhat rounded for suitably engaging the yielding recesses correspondingly formed in the neck-section 33 of the inflated form, shown in Fig. 6ª.

Blanks, constituting the bottom of the bottle to be formed, are fed into the machine from the side by an inclined rack, composed of a bottom plate 85, and side plates 86. The blanks are disposed edgewise within the rack, and roll by gravity to a receiver 87, secured upon an arm 88, fixed at one end of a short rock-shaft 89, hingedly mounted in a bearing 90, formed on the intermediate frame 6. On the opposite end of rock-shaft 89, is secured a lever 91, which is actuated by a cam-rod 92 from the cam 93, secured upon shaft 81. This cam at each revolution lowers the receiver 87 to admit a blank, which it then raises to a position centrally in line with the form-shaft 36. The blanks indicated by numeral 94, and more particularly shown in Fig. 13, are formed with an outwardly-extending flange 95, and when positioned by the receiver are engaged by a clamp-plate 96, removably secured to the clamp-head 97. The head is centrally bored to slidingly receive the end 98 of the reciprocatory clamp-shaft 99, the shaft end being reduced for a portion of its length and provided with a detachable terminal stop-nut or washer 100, movable within a recess 101, formed in the head. The bore of the clamp-head includes an inwardly-extending flange or shoulder 102, which slidingly bears upon the reduced portion of the shaft-end and constitutes an abutment for one end of the spiral spring 103, which loosely encircles the reduced shaft-end, the shoulder of which engages the opposite end of the spring to normally urge the head outward against the stop-nut 100. A short spline or key 104 is fixed to the shaft-end 98, and slidingly engages a key-way in the hub and prevents relative rotation. Dovetailed grooves, circular in form, are provided in the head for slidingly receiving the centralizing-jaws 105, which latter are formed with lugs 106, which are threaded to receive the adjusting screws 107, the heads of which engage a collar 108, formed on the shaft 99, the screw-heads being normally held in contact with the collar by the springs 109, loosely mounted in the head and abutting at their opposite ends the clamp-plate 96 and the ledges 110, the latter formed on the centralizing-jaws. The springs 109 acting in conjunction with the spring 103 normally tend to retract the jaws, the terminals of which are adapted to engage the inner corner of the flanged blank, as shown in dotted lines.

For the actuation of the centralizing-jaws 105, a movable collar 111 is employed, slidably mounted on the sleeve 112, which latter is fixed in the boss 113, by the set-screw 114, the boss being formed on the cross-head 115, which is slidable on the ways 116 of the side frames 2 and 3. The cross-head 115 with its connected sleeve 112 rotatably supports the inner or actuating end of clamp-shaft 99, the relative position of which cross-head is longitudinally maintained by the fixed collar 108, and the detachable collar 117, adjustably secured upon shaft 99. Fixed to the top of collar 111 is a stud 118, to which is pivoted one end of a link-connection 119, the opposite end being likewise connected by the stud 120 to the arms 121 of the grippers 122. The grippers are pivoted to the boss 113 by the studs 123, and the movements about which points for the opening and closing of the grippers are effected by the movement of the actuating-collar 111 upon the sleeve 112. In its forward movement, the collar opens the grippers and engages the boss 113 to move the cross-head 115 toward the form for the engagement of a suitably-positioned blank by the clamp-plate 96, which yieldingly urges the blank against the form, causing a sliding movement of the head 97 upon the shaft-end 98 which projects the jaws 105 to centralize the blank. The several springs in the clamp-head are suitably adjusted for effecting a simultaneous action of the clamping and centralizing devices, which joint action is continued during the formation of the bottle, and serves, together with the rotary movement thereof, to assist in rotating and supporting the free end of the form. The rotation of the clamp-shaft 99 is effected by the gear 124, having a key in the bore thereof for slidingly receiving the longitudinal movement of the shaft, the gear being secured against a corresponding movement by an annular groove in the outer surface of its hub, which rotatably engages an internal tongue formed on the cap 124ª, fixed to the side of frame 5. This gear in turn is driven by gear 61, fixed to shaft 56, and, together with gears 58 and 60, jointly act to drive their respective shafts at a common rate of speed. At the beginning of the return or backward movement of the actuating-collar 111, the clamp-head is released from the bottom of the formed bottle, the centralizing jaws retracted, and as the collar sides upon the sleeve 112 to engage the flange 125, thereon, the grippers 122 are closed by the link-connection 119 to engage the bottom end of the bottle, as indicated by dotted lines, the continued movement of the collar causing a backward movement of the cross-head 115 and acting to withdraw a finished bottle from the form and discharge it from the machine. For imparting the forward and backward movement to the collar 111, studs 126 are fixed thereon for the pivotal connection of the double arms 127, formed at the upper end of the lever 128, which is fulcrumed on a stud 129, fixed in the end of a rock-arm 130, pivotally carried upon a bracket 131, secured to the base of the machine. On the lever 128 is fixed a stud 132, engaged by the cam-rod 133, having a roller 134, actuated by the cam 135, fixed upon the shaft 136, as shown in Figs. 1 and 2. Upon the end frame 5, bearings 137 are secured for the support of shaft 136, upon one end of which is fixed a bevel-gear 138, which is engaged by a corresponding gear 139, fixed on main cam-shaft 16, from which the former shaft is driven a common number of turns in order that the clamp-shaft 99 may be reciprocated at each revolution thereof, or cycle of the machine.

In Figs. 1, 9 and 10 are shown, in part diagrammatically, the means for intermittently feeding, gluing and severing into sections a web and a reinforcing band of paper, or other suitable material, for the formation of a bottle. Leading from the paper-roll 140, the web, of suitable width to form the body and neck of the bottle, is led between the feed-rolls 141, through the reciprocating transverse perforator 142, over the feed and guide roll 143, the guide rolls or pulleys 144 and 145, the latter two carrying the supporting-belts 146, and over the glue-roll 147, interposed between the rolls 143 and 144. The glued surface of the web in passing over the belts is presented face up, and the extent of the adhesively prepared surface of each section is limited to such parts thereof as subsequently overlap each other, and to the part secured to the bottom blank, which constitutes the bottom of the bottle, and is preferably made from paper stock pressed in the form of a disk with an outwardly projecting flange. In the application of the glue to the intermittently movable web, the glue-roll is positioned with respect to the bottle-forming mechanism to preferably admit of at least one rest for suitably saturating and tempering the web-section prior to its introduction into the forming mechanism, said rest occurring at the terminal gluing application of each section. For the application of the glue, a presser-roll 148 engages the web throughout its width and periodically urges it, from its normal line of travel, into contact with the glue-roll 147, which likewise extends the full width of the web and is supplied with glue from the reservoir or fountain 149. Arms 150, fixed upon the rock-shaft 151, movably support the presser-roll 148, which motion is communicated through the lever 152 and the cam-rod 153 from the cam 154, (shown in Figs. 1 and 9) the lever being fixed upon shaft 151, and the cam-rod pivotally connected to the end of the lever. Projecting from one of the arms 150, is an extension 155, which rotatably supports a short auxiliary presser-roll 156, the extension yieldingly connecting, by a spring 157, the arm 158, loosely mounted upon the axle 159, of the glue-roll 147. Upon the arm 158, are rotatably mounted short glue-feeding rolls 160 and 161, the former receiving its supply from the main glue-roll 147 and transmitting it through the latter roll to the web by the coaction of the presser-roll 156 and the spring, which also conjointly serve by their tension upon the web to assist in lifting the latter from the main glue-roll upon the outward movement of the main presser-roll 148. As thus arranged, the gluing device applies on each web-section an adhesive surface indicated by the shaded portions 162 and 163, leaving a blank initial space 164, which engages the removable form in the shaping of the bottle and permits of its detachment therefrom. The glued portion 162 extends the full width of the sheet or section, and the portion 163, constituting a margin on one side of the blank space, is of suitable width to admit of adhesively securing it to both the inner and outer surfaces of the projecting flange formed on the bottom-blank.

The intermittent movement of the feeding and gluing devices is effected from cam 165, which actuates a cam-rod 166, carrying at its outer end a gear-rack 167, engaging a pinion 168, loosely mounted for oscillatory movement upon the end of shaft 169, which carries the feeding and guiding roll 143. The pinion 168 is fixed to an arm 170, which oscillates therewith, and carries at its outer end a pawl 171, urged by a spring 172 into engagement with the teeth of a ratchet-wheel 173, the latter being fixed upon the roll-shaft 169. By the forward movement of the cam-actuated reciprocating rack 167, and the engagement of the pawl 171 with the ratchet-wheel 173, the feeding-roll 143 is rotated to advance the web a distance of one section, corresponding with the length of sheet required for the formation of a single bottle; and during the return movement of the rack, the pawl yieldingly slides over the teeth of the ratchet-wheel for arresting the movement of the roll and web. Coacting with feeding-roll 143, is a tension-roll 143ª, which serves to assist the feeding of the web. Also in connection with feeding-roll 143, a gear of similar diameter is secured to the shaft thereof for positively driving the glue-roll 147 and the guiding roll 144, the former, through the intermediate 147ª, and the latter, through the intermediates 144ª.

Between the gluing and feeding devices and the forming mechanism, the web is carried by the belts 146, and fed over the guide-bars 174 to the rotatable form, carried by shaft 36. For rotatively supporting the belt-roll 145, arms 175 are employed, which are fixed upon rock-shaft 176, suitably positioned on the frame of the machine. Also carried by the frames, are fixed bearings for receiving the journal-ends of roll 177, adapted to engage the initial blank portion of each web-section during its interval of rest by the upward pressure of roll 145, transmitted from the cam 178 through the cam-rod 179, which engages, at its upper end the roll-carrying arms 175. The cam for this movement is fixed upon shaft 180, rotatably mounted in bearings 181, and provided with a fixed driving-gear 182, engaged by a corresponding gear 183, fixed upon the main cam-shaft 116, with which it makes a common number of turns. Each revolution of cam-shaft 180 corresponds with a cycle of the machine, and the cam 178, secured thereon, at each revolution, projects and retracts roll 145, the projecting movement occurring at the period of the web's rest, and serving to clamp the same for severing the advance section thereof, along a line of adjacent perforations, by the tension imparted thereto from the rotative action of the forming mechanism. The transverse rows of perforations, dividing the web into sections of suitable lengths for the formation of the bottles, one of which rows being indicated by 184, are formed during the periods in which the web is at rest, and the movement therefor, of the reciprocating-blade in the perforator 142 is effected by the lever 185, the cam-rod 186, and the cam 187, fixed on shaft 180.

The means for securing the margin of a web-section to the flange of a bottom-blank, is shown in Figs. 1, 2, 11 and 12, and consists of a bracket 188, secured to the frame of the machine, and carrying a cam-section 189, engaged by a roller 190, mounted on an arm 191, which is longitudinally slidable on a sleeve 192, loosely mounted on the shaft 56. A feather or spline 193 is fixed in the sleeve and slidingly engages a feather-way in the arm to prevent relative rotative movement therewith. Upon a diametrically reduced inner section of the sleeve, adjacent the pressure-roll 63, is a loosely mounted hub 194, carrying an arm 195, on the outer end of which is rotatably mounted an outwardly-flanged primary forming-roll 196, the body of which is adapted to yieldingly engage the periphery of the bottom-blank to press and secure thereon an adhesively prepared web-section, and to inwardly bend said section by the projecting flange of said roller. Coacting with the primary forming-roll is a secondary forming-roll 197, rotatably mounted on the arm 198, integrally formed with arm 191. Upon an outwardly-projecting flange 199 of the sleeve 192, is a lever-arm 200, on the outer end of which is pivotally connected a cam-rod 201, actuated by a cam 202, fixed on the shaft 16. Upon each revolution of the cam, the arm 200 is oscillated to make a forward and backward movement, the forward movement rotating the arms 191 and 198 into the position indicated in Fig. 11, which movement, acting in conjunction with the cam 189 and the roller 190, on the arm 191, serves to inwardly slide the latter arm, together with the connected arm 198, upon the sleeve 192, the inward movement causing the secondary forming-roll to move under the projecting flange of the bottom-blank to secure the adhesively prepared web-section to the inner surface thereof. A tension spring 203 connects the arm 195 to the arm 198, and in the forward movement of the latter the spring tension insures the necessary working pressure for the forming-roll 196. Upon the backward movement of the several arms, the roll is withdrawn from the bottom-blank, and is raised sufficiently to admit of the removal of the finished bottle, during which backward movement, the spring tension is diminished, and the arm 198 engages a lug 204, secured to arm 195, for disengaging the forming-roll 196.

The means for feeding, gluing, severing into sections and applying a reinforcing-band to the mouth of the bottles, and illustrated in Figs. 1, 9 and 10, includes a roll 205, from which the band 206 is led, between the feed-rolls 207, through the reciprocating transverse perforator 208, over the feed and guide roll 209, the glue-roll 210, the guide-rolls 211 and 212, the latter two carrying the supporting-belt 213. In like manner, as in the main web, the band is transversely perforated to form sections of suitable lengths, in advance of applying the glue, which by continuous contact with the glue-roll, covers the entire upper surface thereof, as presented upon the belt 213. Intermittent movement is given to the band-feeding and the gluing devices by a rack and ratchet movement, actuated by a cam-rod 214, from a cam-wheel 215, the construction and arrangement of the several parts being similar to that described for the main web. The interengaging driving means from the feed-roll 209 to the glue-roll 210 and the guide-roll 211, is also similarly provided for by the intermediates 216, 217 and 218. For assisting the feeding of the band, in conjunction with roll 209, a tension-roll 219 is employed, which is rotatably mounted in suitably positioned bearings, not shown. The band is led from the belt 213, over the guide-bar 220, to the mouth-section of the rotatable form, and the severing of the several sections thereof is effected in the manner similar to that of the main web, by the clamping movement given to guide-roll 212, rotatably mounted in arms 221, fixed on rock-shaft 222, the latter being actuated by the cam-rod 223, from a cam fixed on a face of the cam-wheel 215, secured to shaft 180. In the clamping movement of the guide-roll 212, the band engages a serrated roll 224, rotatably mounted in bearings fixed to the frame of the machine, the serrations on the roll being provided to prevent displacement of the glue on the surface of the band. The actuation of the blade of the transverse perforator 208, is transmitted from shaft 180, and the cam 225, through the cam-rod 226, and the pivotally-mounted arm 227.

The means for forming the mouth of the bottle, including the shaping and securing of the reinforcing-band, as shown in Figs. 2, 12, 14 and 15, provides a rigid forming-sleeve 228, rotatably secured on form-shaft 36, by a spline 229, over which it slides longitudinally on the shaft. The inner end, 230, of the sleeve, constitutes a forming member, the length of which corresponds substantially with the length of the bottle-mouth, and from which point the sleeve is outwardly reduced to provide a clearance for the projecting adhesively-prepared reinforcing-band 206. Extending outwardly from the reduced portion, the sleeve is enlarged in diameter to form a cam-section 231, which merges into a cylindrical portion to form a dwell 232. A groove is turned in the forming-sleeve near its outer end for engagement with the rollers 233, rotatably secured by studs 234 to the arms 235, formed on the upper end of the lever 236, which reciprocates the sleeve, the outer extreme of movement being indicated by the dotted lines, as shown in Fig. 14. The lever 236 is fulcrumed on shaft 74, secured in the bracket 75, fixed to frame 4, and its movement is transmitted through the cam-rod 237, pivotally connected to the lower end of the lever and engaging a cam fixed to shaft 78.

Secured upon the end frame 4 of the machine, is a bracket 238, slidably supporting a block 239, on the inner end of which is a stud 240, rotatably supporting a forming-roller 241. For inwardly urging the latter, the block is provided with a recess for receiving a spring 242, which engages the end of a tension-screw 243, adjustable in a thrust block 244, of the bracket 238, for adjustably and yieldingly controlling the action of the forming-roller. Also, for maintaining the block in slidable relation with the bracket, a screw 245 loosely engages a slot in the latter, and is secured at its end into the lower side of the block. Slidably mounted by a tongue in a horizontal slot in the block, is an arm 246, on the projecting end of which is rotatably mounted a bearing-roller 247, engaged by the cam-section of the sleeve 228, for the actuation of a forming-plate 248, secured by screws 249 to the end of the tongue formed on the slidable arm 246. The plate is provided with an elongated slot 250, which loosely engages the shank of stud 240, to serve as an additional support for its working-end 251. For inwardly urging the arm 246 and its connected plate, a spring 252 is employed, which is mounted in a recess in the arm, and engages a screw-end 253, adjustible in a thrust-lug 254, formed on the end of block 239. By means of the spring 242, the forming-roller 241 coacts with the forming member 230 to shape a portion of an adhesively prepared web-section into the form of a bottle-mouth, and to additionally shape and secure to the latter a section of a reinforcing-band, likewise adhesively prepared.

In forming the band about the exterior of the mouth, the forming-plate 248 is retained in its outer position, against the action of the spring 252, by the engagement of roller 247 with the dwell portion 232 of the sleeve, as shown in the position indicated in Fig. 14. Upon the completion of this portion of the mouth-forming operation, the forming-sleeve 228 is withdrawn to its outward extreme of movement, which serves, by the suitably shaped cam-section thereon, to permit of the spring-urged inward movement of the forming-plate; which motion inwardly bends, at right-angles, the projecting part of the band over the edge of the underlying web-section, constituting the primary mouth-portion of the bottle. The inwardly bent band-section is then turned again at right-angles, into the bottle, and secured to the interior surface of the primary mouth portion, by the inward or return movement of the forming-sleeve, which is again inserted into the mouth against the yielding action of the forming-roller 241, which continues its forming action during the rotation of the form.

In the operative cycle of the machine, twelve consecutive turns of the form-shaft 36 are ordinarily required for applying and shaping the web and band sections to form a bottle; also an additional period is required for the cycle, corresponding with two turns of the form-shaft, during which the latter is arrested for delivering the finished bottle and inserting a new bottom-blank. As the form-shaft, including its driving-shafts 56 and 8, are intermittently driven from the continuously-running driving-pulley 10, it will follow that the speed of the several cam-shafts 16, 78, 81 and 180, which are driven continuously from the pulley, must be reduced from fourteen to one, in order that each cam may be suitably timed to perform its respective work at each revolution or cycle of the machine.

As shown in Fig. 3, for shaft 16, each of the several cams are constructed with a raceway, which engages a roller, mounted on a cam-rod, one end of which is guided by means of a slot formed therein to slidably engage its respective shaft, its opposite end being connected for positive reciprocation to a respective part.

In the above arrangement, for each cycle, the several cams, and the intermittently moving form-shaft 36, are divided with respect to their joint work, into fourteen periods, and, for convenience, assuming that at the beginning of the cycle a bottom-blank has been clamped against an inflated form, the form-shaft and cams will perform their respective work in approximately the following periods: During the first twelve periods, form-shaft 36 is continuously rotated twelve turns for forming the web and band sections, and rests the last two periods. During the first three periods, cam 165 operates to feed a previously prepared web-section to the form, and rests the remaining eleven periods. During the second and third periods, cam 154 operates for applying the adhesive to a following web-section. During periods four to fourteen, inclusive, cam 178 operates to clamp and arrest the movement of the next following web-section. During periods six, seven and eight, cam 187 operates to perforate a following web-section. During periods five, six and seven, a cam on a face of wheel 215 operates to feed a section of the reinforcing-band to the form. During periods one to four, inclusive, and seven to fourteen, inclusive, a cam on the opposite face of wheel 215 operates to clamp and arrest the movement of the next following band-section. During periods ten to twelve, inclusive, cam 225 operates to perforate the reinforcing-band. During periods five to eleven, inclusive, a cam 202 operates to secure the margin of the web-section to the inner surface of the bottom-blank. During periods nine to twelve, inclusive, a cam on a face of wheel 77 operates to withdraw and return the forming-sleeve 228 of the mouth-forming devices. During periods twelve to fourteen, inclusive, a cam on the opposite face of the wheel 77 operates to inwardly move or retract the crimping-blades 64, to permit of the removal of the finished bottle. During periods twelve and thirteen, cam 55 operates the three-way cock to alternately deflate and inflate the form. During periods thirteen and fourteen, cam 135 operates to reciprocate lever 128 for alternately discharging a finished bottle and clamping a new bottom-blank in position. And during period fourteen, cam 93 operates the arm 88 to raise a bottom-blank into position for clamping against the form.

In feeding a web-section to the rotatable inflated form, the cylindrical body portion thereof, coacting with the pressure-rolls, is adapted to draw this portion of the web taut and form a cylindrical bottle section composed of a plurality of thicknesses of web adhesively secured together. In forming the inwardly-tapering neck portion of the bottle, the crimping-blades 64 of the pressure-rolls force the excess of web, due to the reduced size of this part, into the radial recesses 260 formed on the corresponding part of the form, the depth of which recesses conforms with the excess of material, and forms thereby inwardly-extending stiffener ribs on the bottle. By the action of the crimping-blades in shaping the neck of the bottle, the excess of web is evenly divided over the surface thereof, which evenness in division of web, likewise extends to the adjacent cylindrical mouth portion of the form, where it is shaped by the mouth-forming devices to a uniform thickness before applying the reinforcing-band.

For delivering the finished bottle from the machine, suitable guides (not shown) are provided, upon which the bottle is discharged by the suitably timed grippers 122.

While I have shown the preferred embodiment of my invention, it is to be understood that various changes may be made in the specific construction and arrangement of parts without departing from the spirit and scope of the invention.

What I claim as my invention and desire to secure by Letters Patent, is:—

1. In a bottle-making machine of the character described, the combination of forming mechanism, means for feeding bottom-blanks thereto, means for feeding and transversely severing an adhesively prepared web, and means for actuating said forming mechanism to shape the severed section of web and form from a portion thereof a contracted neck and mouth and secure the opposite portion to a bottom-blank, substantially as set forth.

2. In a bottle-making machine of the character described, the combination of forming mechanism, means for feeding bottom-blanks thereto, said bottom-blanks having an outwardly-projecting flange, means for feeding and transversely severing an adhesively prepared web, means for actuating said forming mechanism to shape the severed section of web and form from a portion thereof a contracted neck and mouth and secure the opposite portion to a bottom-blank on the opposite surfaces of the flange thereof, substantially as set forth.

3. In a bottle-making machine of the character described, the combination of forming mechanism, means for feeding bottom-blanks thereto, means for feeding and transversely severing an adhesively prepared web, means for actuating said forming mechanism to shape the severed section of web and form from one side thereof a contracted bottle mouth and secure the opposite side to a bottom-blank, means for feeding and transversely severing an adhesively prepared reinforcing-band, and means for securing the severed band section to the bottle mouth, substantially as set forth.

4. In a bottle-making machine of the character described, the combination of forming mechanism, means for feeding bottom-blanks thereto, means for feeding and transversely severing an adhesively prepared web, means for actuating said forming mechanism to shape the severed section of web and form from one side thereof a contracted bottle-mouth and secure the opposite side to a bottom-blank, means for feeding and transversely severing an adhesively prepared reinforcing-band, and means for securing the severed band section to said bottle-mouth on the inner and outer surfaces thereof, substantially as set forth.

5. In a bottle-making machine of the character described, the combination with forming mechanism including a flexible form having a contracted neck portion, means for inflating said form, means for feeding a bottom-blank thereto, means for feeding an adhesively prepared sheet to said forming mechanism, means for actuating said forming mechanism to shape said sheet about said form and secure it to the bottom-blank to form a bottle, and means for deflating said form for the removal of said bottle, substantially as set forth.

6. In a bottle-making machine of the character described, the combination with forming mechanism including a flexible form for the interior of the bottle provided with a reduced mouth portion, means for inflating said form, means for feeding a bottom-blank thereto, means for feeding an adhesively prepared sheet to said forming mechanism, means for actuating said forming mechanism to shape said sheet about said form and secure it to the bottom-blank to form a bottle, means for feeding an adhesively prepared reinforcing-band and securing it to the mouth portion of said bottle, and means for deflating said form for the removal thereof.

7. In a bottle-making machine of the character described, the combination of forming mechanism including a flexible form for the interior of the bottle, said form having an inwardly tapering neck portion provided with radial recesses, means for inflating said form, means for feeding a bottom-blank thereto, means for feeding an adhesively prepared sheet to said forming mechanism, means for actuating said forming mechanism to shape said sheet about said form and project it into the recesses of the tapered neck portion, means for securing said sheet to the bottom-blank, and means for deflating said form for the removal of said bottle.

8. In a bottle-making machine, the combination with means for feeding an adhesively prepared sheet, a flexible rotatable form having a tapered portion provided with recesses, means for inflating and deflating said flexible form, a pressure-roll coacting with said form, and blades on said pressure-roll coacting with said recesses.

9. The combination with means for feeding an adhesively prepared sheet, a flexible rotatable form having an inwardly-tapered neck portion provided with recesses, means for inflating and deflating said flexible form, pressure-rolls coacting on opposite sides of said form, and blades on said pressure-rolls coacting with said recesses.

10. The combination with a main glue roll, means for leading a web adjacent thereto, a main presser-roll engaging said web to periodically urge the web in contact with the main glue-roll, an auxiliary presser-roll arranged for continuous engagement with said web, an auxiliary glue-roll in yielding coaction with said auxiliary presser-roll, and glue feeding means between said main and auxiliary glue-rolls.

11. The combination with a rotatable shaft, a body-form fixed thereon, a mouth-form rotatable with and slidable longitudinally on said shaft, a laterally-movable forming-plate, means for reciprocating said mouth-form, and means actuated by the reciprocating mouth-form to laterally move said forming-plate.

12. The combination with a rotatable and longitudinally-movable shaft, a clamp-head yieldingly supported for longitudinal movement on an end thereof, centralizing-jaws slidable in the head, and means for actuating said shaft for jointly engaging said clamp and projecting said jaws.

13. The combination with a rotatable and longitudinally-slidable shaft, a bearing rotatably supporting said shaft and slidable therewith, grippers operatively mounted on said slidable bearing, and common means for sliding said shaft and actuating said grippers.

14. The combination with a rotatable form, a shaft rotatably mounted in line with said form, a clamp-head yieldingly slidable longitudinally on said shaft and rotatable therewith, centralizing-jaws slidable in said head, spring retracting means engaging said jaws, means for feeding bottom-blanks to said form, and means for actuating said shaft for jointly centralizing and clamping the blanks to said form.

15. The combination with an inflated flexible form, means for forming a bottle thereon, gripping-jaws, means for deflating said form, and means for actuating said gripping-jaws to engage and withdraw the bottle from said form.

Signed at New York in the county of New York and State of New York this seventh day of February A. D. 1910.

LUTHER P. BROWN.

Witnesses:
C. W. LOVELL,
LILLIE MAE BROWN.